US009300923B2

(12) United States Patent
Mehrotra et al.

(10) Patent No.: US 9,300,923 B2
(45) Date of Patent: Mar. 29, 2016

(54) METHOD AND APPARATUS FOR IMPROVING VIDEO PERFORMANCE IN A WIRELESS SURVEILLANCE SYSTEM

(75) Inventors: Praveen Mehrotra, Fresno, CA (US); Farzin Aghdasi, Clovis, CA (US); Lawrence E. Bakst, Sunnyvale, CA (US)

(73) Assignee: Pelco, Inc., Clovis, CA (US)

( * ) Notice: Subject to any disclaimer, the term of this patent is extended or adjusted under 35 U.S.C. 154(b) by 1604 days.

(21) Appl. No.: 12/055,495

(22) Filed: Mar. 26, 2008

(65) Prior Publication Data

US 2008/0239075 A1    Oct. 2, 2008

Related U.S. Application Data

(60) Provisional application No. 60/920,340, filed on Mar. 26, 2007.

(51) Int. Cl.

| *G06F 15/16* | (2006.01) |
| *H04N 7/18* | (2006.01) |
| *H04N 19/159* | (2014.01) |
| *H04N 19/172* | (2014.01) |

(52) U.S. Cl.
CPC ............ *H04N 7/181* (2013.01); *H04N 19/159* (2014.11); *H04N 19/172* (2014.11)

(58) Field of Classification Search
CPC .... H04N 7/181; H04N 19/172; H04N 19/159
USPC .......................................... 709/223; 348/143
See application file for complete search history.

(56) References Cited

U.S. PATENT DOCUMENTS

| 5,566,208 A * | 10/1996 | Balakrishnan ................ 375/240 |
| 7,388,912 B1 * | 6/2008 | Katsavounidis et al. 375/240.02 |
| 2003/0074674 A1 * | 4/2003 | Magliaro ....................... 725/118 |
| 2004/0242204 A1 * | 12/2004 | Ido et al. .................... 455/412.1 |
| 2006/0104345 A1 | 5/2006 | Millar |
| 2006/0218264 A1 * | 9/2006 | Ogawa et al. ................. 709/223 |
| 2007/0237223 A1 * | 10/2007 | Lee .......................... 375/240.03 |
| 2008/0025300 A1 * | 1/2008 | Lide et al. ..................... 370/389 |

* cited by examiner

*Primary Examiner* — Joseph Greene
(74) *Attorney, Agent, or Firm* — Hamilton, Brook, Smith & Reynolds, P.C.

(57) ABSTRACT

A method of improving video performance in video surveillance system having a wireless encoder connected to a video surveillance network by a wireless access point device comprises the steps of allocating channel bandwidth to the wireless encoder from the wireless access point device, transmitting packets of video data from the wireless encoder to the wireless access point device, transmitting signals from the wireless access point device to the wireless encoder, monitoring the strength of the signals received by the wireless access point device, the strength of the signals received by the wireless encoder, and the number of lost packets of video data transmitted from the wireless encoder to the wireless access point device, sending a request from the wireless encoder to the wireless access point device to change the bit transmission rate of the wireless encoder if the strength of the signals received by the wireless access point device is less than a first threshold, if the strength of the signals received by the wireless encoder is less than a second threshold, or if the number of lost packets of video data is greater than a third threshold, and changing the bit transfer rate of the wireless encoder if the wireless access point device approves the change.

14 Claims, 8 Drawing Sheets

METHOD AND APPARATUS FOR IMPROVING VIDEO PERFORMANCE IN A WIRELESS SURVEILLANCE SYSTEM

CROSS-REFERENCE TO RELATED APPLICATION

This application is related to and claims the benefit of U.S. Provisional Patent Application Ser. No. 60/920,340, filed Mar. 26, 2007, entitled TRAFFIC SCHEDULING ALGORITHM FOR OUTDOOR WIRELESS VIDEO STREAMING APPLICATION, the entirety of which is incorporated herein by reference.

STATEMENT REGARDING FEDERALLY SPONSORED RESEARCH OR DEVELOPMENT

N/A

BACKGROUND OF THE INVENTION

This invention relates generally to surveillance systems and, in particular, to a method and apparatus for improving video performance in a wireless video surveillance system.

IEEE 802.11 is a set of standards for wireless local area network communication. In particular, IEEE 802.11e pertains to wireless local area network applications through modifications to the media access control layer. This IEEE802.11e standard covers the delay sensitive applications such as streaming multimedia. Today's video surveillance systems utilize video streaming and have started using cameras with video encoders to convert the video images into MPEG video streams, for example, MPEG-4, and employing wireless technology to enhance the possible applications. In an outdoor deployment of video encoders using IEEE 802.11 protocol, typically multiple wireless video encoders connect to the network through a wireless access point in a point-to-multipoint topology. Alternatively, the system could consist of a point-to-point topology with a wireless bridge transmitting video stream from an encoder to a peer wireless bridge.

In a point-to-multipoint topology for video streaming applications, it is important to provide guaranteed bandwidth to wireless video encoders otherwise the video at the decoding station, such as a user's workstation, might look pixilated. The IEEE 802.11e standard specifies mechanisms, which enable one to provide guaranteed bandwidth. These mechanisms take into account the characteristics of traffic to allocate bandwidth. However, such implementations do not take into account the variable nature of the typical wireless channel, which can result in decreased wireless channel resources. The integrity and quality of the video images captured by a video surveillance system are critical in many security applications. Moreover, the industry demands the highest quality video even under adverse circumstances. Hence, there is a need in the industry for a method to adjust bandwidth allocation and improve video performance of wireless applications in video surveillance systems.

SUMMARY OF THE INVENTION

In accordance with the present invention there is provided a method of improving video performance in a video surveillance system having a wireless encoder connected to a video surveillance network by a wireless access point device. The method comprises the steps of allocating channel bandwidth to the wireless encoder from the wireless access point device, transmitting packets of video data from the wireless encoder to the wireless access point device, transmitting signals from the wireless access point device to the wireless encoder, monitoring the strength of the signals received by the wireless access point device, the strength of the signals received by the wireless encoder, and the number of lost packets of video data transmitted from the wireless encoder to the wireless access point device, sending a request from the wireless encoder to the wireless access point device to change the bit transmission rate of the wireless encoder if the strength of the signals received by the wireless access point device is less than a first threshold, if the strength of the signals received by the wireless encoder is less than a second threshold, or if the number of lost packets of video data is greater than a third threshold, and changing the bit transfer rate of the wireless encoder if the wireless access point device approves the change.

In another aspect of the present invention there is provided a method of improving video performance in a video surveillance system having an encoder connected to a first wireless bridge transmitting packets of video data to a second wireless bridge connected to a video surveillance network. The method comprises the steps of transmitting packets of video data from the first wireless bridge to the second wireless bridge, transmitting signals from the second wireless bridge to the first wireless bridge, monitoring the strength of the signals received by the second wireless bridge, the strength of the signals received by the first wireless bridge, and the number of lost packets of video data transmitted from the first wireless bridge to the second wireless bridge, sending a request from the first wireless bridge to the second wireless bridge to change the bit transmission rate of the first wireless bridge if the strength of the signals received by the first wireless bridge is less than a first threshold, if the strength of the signals received by the second wireless bridge is less than a second threshold, or if the number of lost packets of video data is greater than a third threshold.

In a further aspect of the present invention there is provided a video surveillance system comprising a network, a wireless access point connected to the network, a camera, a wireless encoder connected to the camera for transmitting packets of video data from the camera to the wireless access point, the wireless access point allocating channel bandwidth to the wireless encoder and transmitting signals to the wireless encoder indicating the strength of the signals received from the wireless encoder and the number of lost packets of video data, the wireless encoder determining the strength of the signals received from the wireless access point, the wireless encoder monitoring the strength of the signals received by the wireless access point device, the strength of the signals received by the wireless encoder, and the number of lost packets of video data transmitted from the wireless encoder to the wireless access point device, the wireless encoder sending a request to the wireless access point to change the bit transmission rate of the wireless encoder if the strength of the signals received by the wireless access point is less than a first threshold, if the strength of the signals received by the wireless encoder is less than a second threshold; or if the number of lost packets of video data is greater than a third threshold; and changing the bit transfer rate of the wireless encoder if the wireless access point approves the change.

In still another aspect of the present invention there is provided a video surveillance system comprising a network, a camera, an encoder connected to said camera, a first wireless bridge connected to the encoder, a second wireless bridge connected to the network, the first wireless bridge transmitting packets of video data from the camera to the second wireless bridge, the second wireless bridge transmitting signals to the first wireless bridge indicating the strength of the signals received from the first wireless bridge and the number of lost packets of video data, the first wireless bridge determining the strength of the signals received from the second wireless bridge, the first wireless bridge monitoring the strength of the signals received by the first wireless bridge, the strength of the signals received by the second wireless bridge, and the number of lost packets of video data transmitted from the first wireless bridge to the second wireless bridge device, the first wireless bridge changing the bit transmission rate of the wireless encoder if the strength of the signals received by the first wireless bridge is less than a first threshold, if the strength of the signals received by the second wireless bridge is less than a second threshold, or if the number of lost packets of video data is greater than a third threshold.

The method and system of the present invention improves video performance in video surveillance systems using both point-to-multipoint and point-to-point topologies. The present invention provides a traffic scheduler for IEEE 802.11 based wireless video streaming applications in outdoor deployments using mechanisms provided by IEEE 802.11e standard to allocate guaranteed bandwidth to wireless video encoders and video encoders connected to wireless bridges. The present invention interfaces with the 802.11e and the wireless media access control layer and dynamically adjusts bandwidth based on current channel condition and provides different error handling for I-frames versus P-frames in the MPEG-4 stream to provide improved video performance.

Other advantages and applications of the present invention will be made apparent by the following detailed description of the preferred embodiment of the invention.

DETAILED DESCRIPTION OF THE INVENTION

Figure 1:
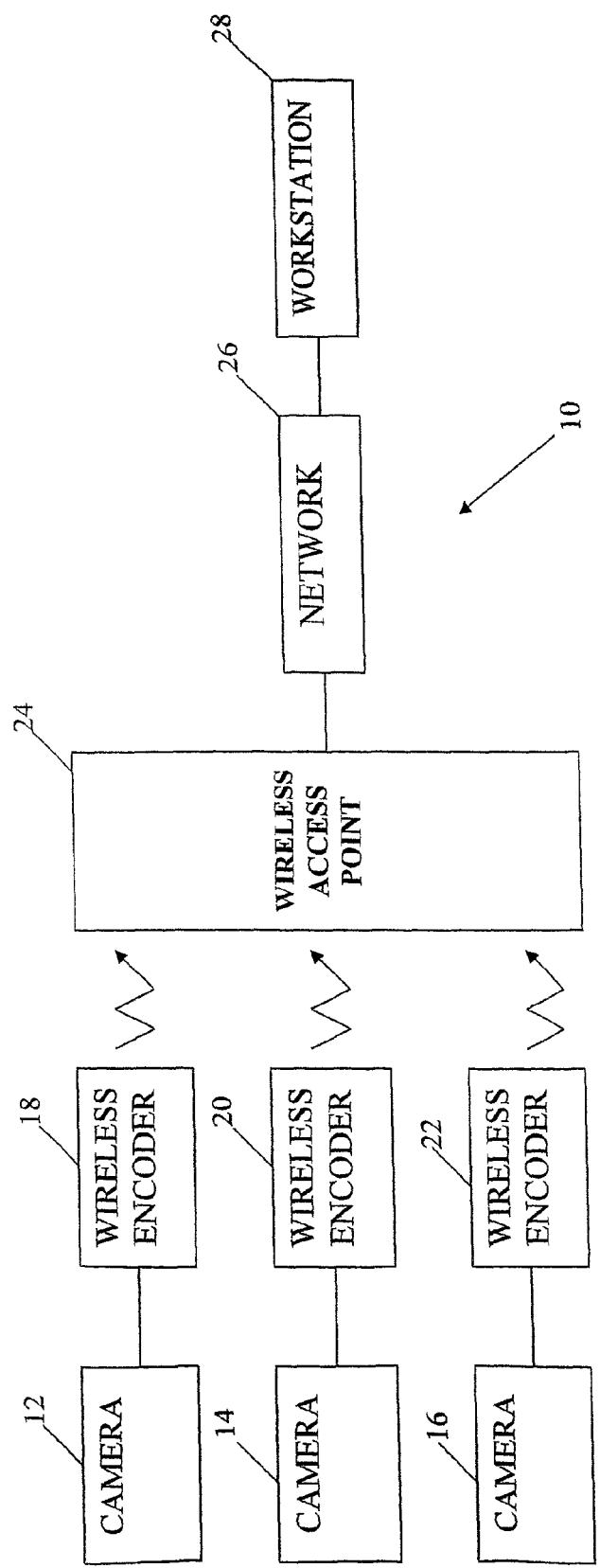
FIG. 1 is a block diagram of one embodiment of the present invention.

FIG. 1 illustrates a video surveillance system 10 having point-to-multipoint topology for implementing the IEEE 802.11 protocol. A plurality of cameras 12, 14, and 16 are connected respectively to wireless encoders 18, 20 and 22, which encode the video images from their respective cameras in MPEG video streams and transmit the packets of encoded video data to wireless access point 24. Wireless access point 24 is connected to network 26, which can comprise a plurality of cameras, encoders, digital video recorders, network recorders and other video surveillance equipment. A workstation 28, which can be, for example, a personal computer or a user logged into video surveillance system 10 by means of a laptop computer is connected to network 26. Workstation 28 can be running an application program for interfacing and controlling equipment in video surveillance system 10. Through the application, work station 28 can request that one or more of cameras 12, 14, and 16 provide video images at a particular resolution and transfer bit rate. Each of cameras 12, 14, and 16 and each of wireless encoders 18, 20, and 22 are shown as separate devices; however, it should be understood that the cameras and their respective encoders can be a single device. A traffic scheduler implemented at wireless access point 24 allocates channel bandwidth to wireless encoders 18, 20, and 22.

The MPEG video streams consist of a series of data frames encoding pictures. The three types of data frames are I-frames, P-frames, and B-frames. I-frames are encoded as a single image with no reference to any past or future frames. P-frames (predictive) are encoded relative to the past reference frame, which can be a P-frame or I-frame. The past reference frame is the closest preceding reference frame. B-frames (bidirectional predictive) are encoded relative to the past reference frame, the future reference frame, or both frames. The future reference frame is the closest following reference frame, either I-frame or P-frame. The series of frames, which is referred to in the art as a Group of Pictures (GOP), can take many different configurations. The ratio of I-frames, P-frames, and B-frames is determined by the nature of the video stream and the bandwidth constraints of the network and system. In addition, the time required for encoding the video stream may also affect the ratio. MPEG video streams consisting of only I-frames and P-frames have been found to be satisfactory for video surveillance system purposes.

If a video surveillance system is losing frames due to bad wireless channel conditions, then it's preferable to lose P-frames but ensure delivery of I-frames to provide the best video quality under the circumstances. In addition to the numerous steps taken by the method of the present invention to provide the best quality video under the circumstances, the present invention also provides more robust delivery methods for I-frames and will perform better in the presence of wireless channel errors compared to a method, which doesn't differentiate between P and I frames.

Figure 2A:
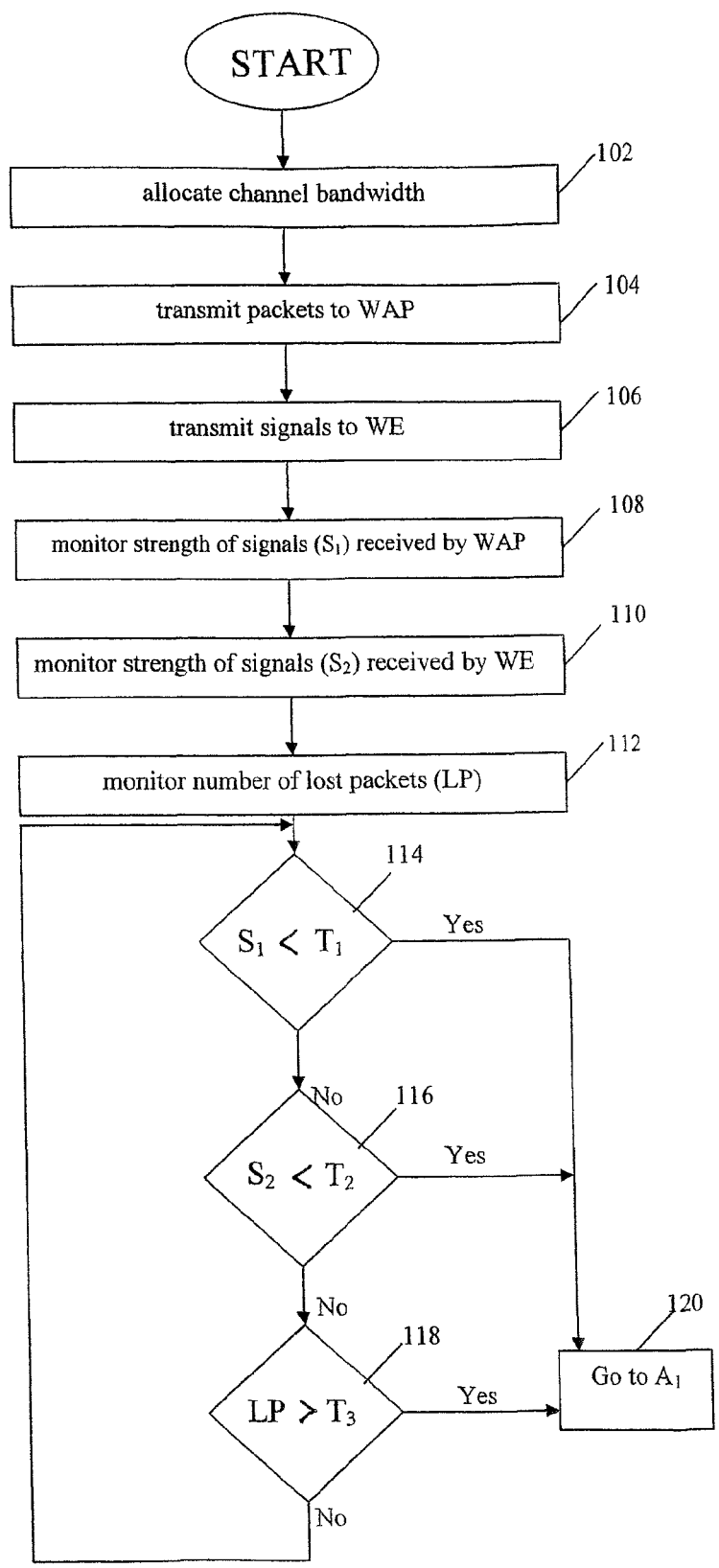
FIGS. 2A-2C are flowcharts illustrating one embodiment of the process of the present invention.
Figure 2B:
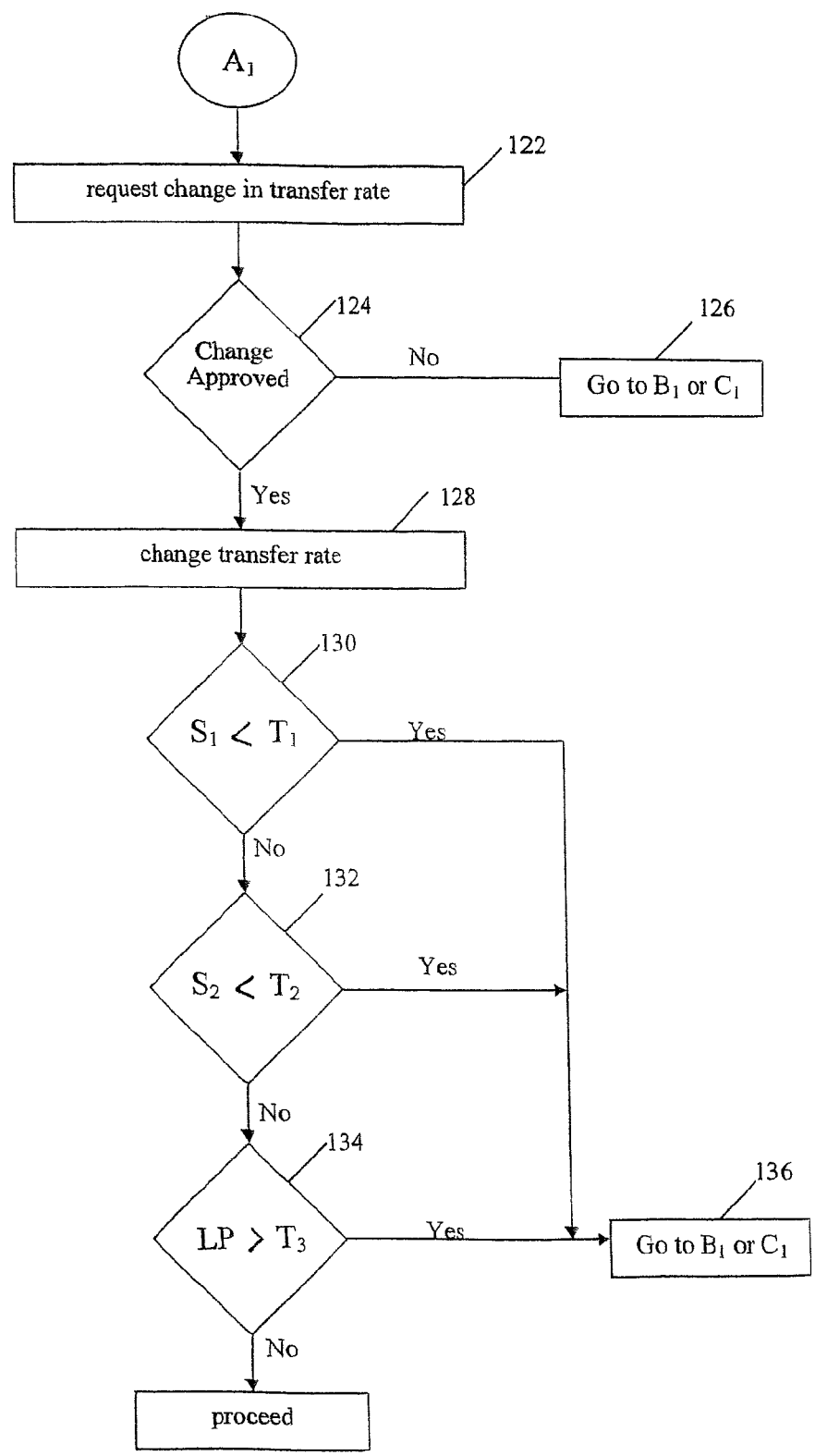
Figure 2C:
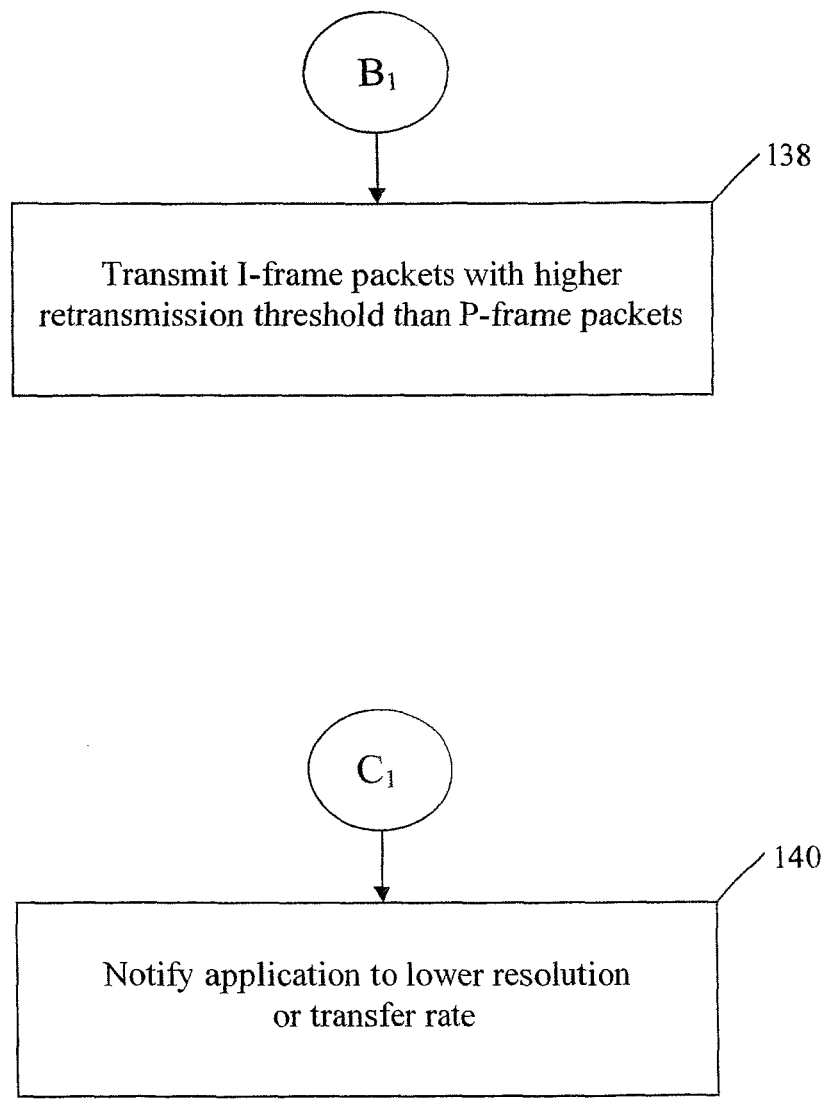

A process for implementing the present invention in the point-to-multipoint topology of video surveillance system 10 is illustrated in FIGS. 2A, 2B, and 2C. At step 102, the traffic scheduler at wireless access point 24 gets traffic specification parameters from wireless encoder 18, 20, and 22 and allocates channel bandwidth to wireless encoders 18, 20, and 22. Although the process applies to all of the encoders, only one encoder will be addressed for the sake of simplicity and clarity. At step 104, wireless encoder 18 transmits packets of video data to wireless access point 24, and at step 106 wireless access point 24 transmits signals to wireless encoder 18. Encoder 18 monitors the strength of the signals received by wireless access point 24 at step 108, the strength of signals received by wireless encoder 18 at step 110, and the number of lost packets of video data in the transmission between encoder 18 and wireless access point 24 at step 112. At steps 114, 116, and 118 respectively, wireless encoder 18 determines if the strength of the signals received by wireless access point 24 is less than a first predetermined threshold, the strength of the signals received by encoder 18 is less than a second predetermined threshold, and if the number of lost packets is greater than a third predetermined threshold. If the answer is no to each of steps 114, 116, and 118, then the process just proceeds to the next step. If the answer is yes in any of steps 114, 116, and 118, then at step 120, the process goes to $A_1$ in FIG. 2B.

At step 122, wireless encoder 18 sends a request to wireless access point 24 to change the bit transfer rate of wireless encoder 18. At step 124, wireless encoder 18 determines if the bit transfer rate change has been approved by wireless access point 24. If the bit transfer rate change is not approved, then the process proceeds at step 126 to $B_1$ or $C_1$ on FIG. 2C. If the bit transfer rate change is approved, then the process proceeds to step 128 where the transfer rate of wireless encoder 18 is changed. The process of the present invention then determines at steps 130, 132, and 134 respectively if the strength of the signals received by wireless access point 24 is less than a first predetermined threshold, the strength of the signals received by encoder 18 is less than a second predetermined threshold, and if the number of lost packets is greater than a third predetermined threshold. If the answer is no to each of steps 130, 132, and 134, then the process just proceeds to the next step. If the answer is yes in any of steps 130, 132, and 134, then at step 136, the process goes to $B_1$ or $C_1$ on FIG. 2C as alternate steps or could be done serially depending upon the parameters desired in the system design. For example, if desired, the process could conduct further analysis on channel performance, such as repeating the analysis done in steps 130, 132, and 134, to determine if only one or both alternate steps should be taken. At step 138, wireless encoder 18 transmits I-frame packets with a higher retransmission threshold than P-frame packets. In step 140, wireless encoder 18 notifies the application, which is located, for example, in workstation 28 and which is controlling camera 12 and wireless encoder 18, to lower the resolution or bit transfer rate or both.

Figure 3:
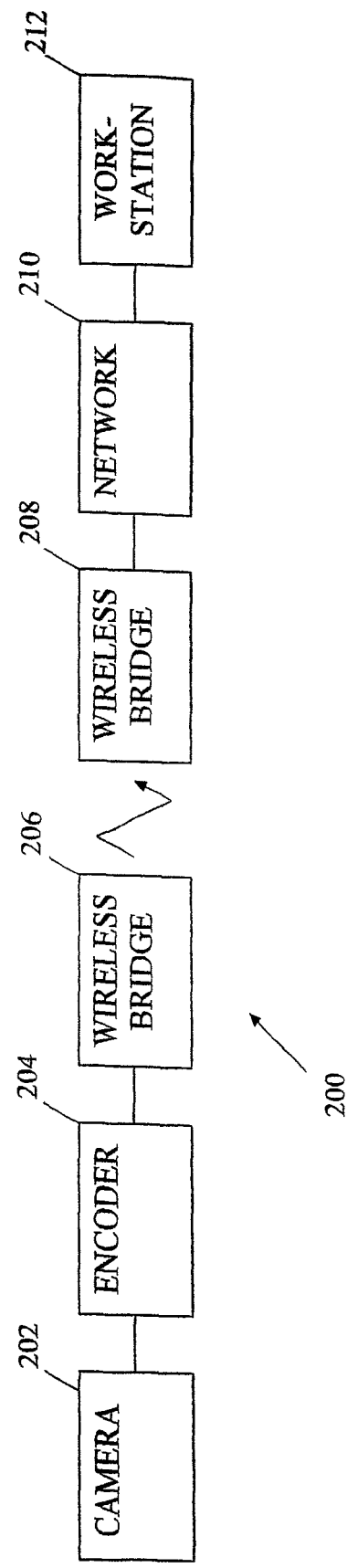
FIG. 3 is a block diagram of one embodiment of the present invention.

FIG. 3 illustrates a video surveillance system 200 having point-to-point topology for implementing the IEEE 802.11 protocol. A camera 202 is connected to an encoder 204, which encodes the video images from camera 202 in an MPEG video stream. Encoder 204 is connected to wireless bridge 206, which transmits the packets of encoded video data to wireless bridge 208. Wireless bridge 208 is connected to network 210, which can comprise a plurality of cameras, encoders, digital video recorders, network recorders and other video surveillance equipment. A workstation 212, which can be, for example, a personal computer or a user logged into video surveillance system 200 by means of a laptop computer is connected to network 210. Workstation 212 can be running an application program for interfacing and controlling equipment in video surveillance system 200. Through the application, workstation 212 can request that camera 202 provide video images at a particular resolution and transfer bit rate. Camera 202 and encoder 204 are shown as separate devices; however, it should be understood that camera 202 and encoder 204 can be a single device. Wireless bridge 206 and wireless bridge 208 operate in accordance with IEEE 802.11 protocol.

Figure 4A:
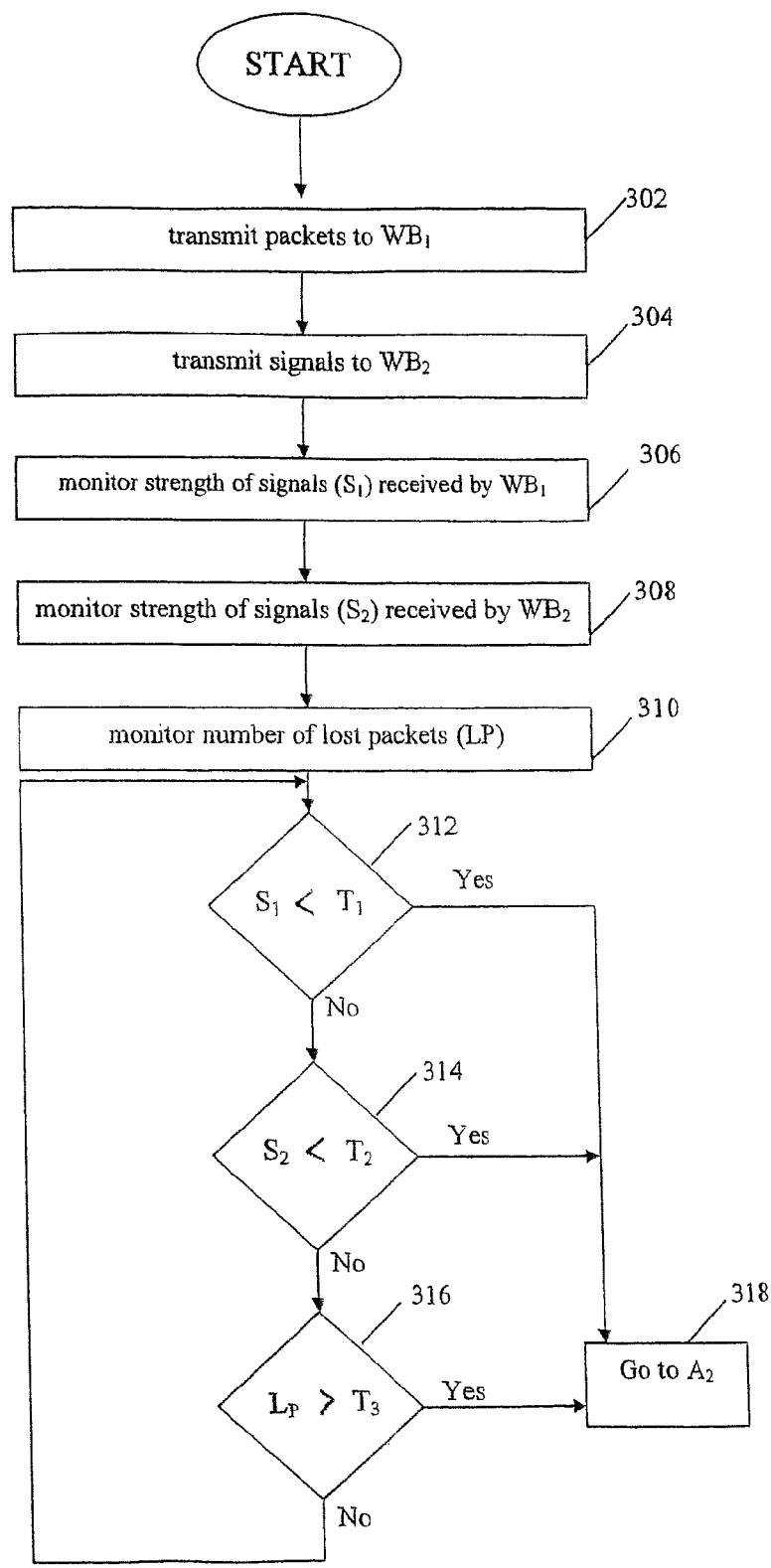
FIGS. 4A-4C are flowcharts illustrating one embodiment of the process of the present invention.
Figure 4B:
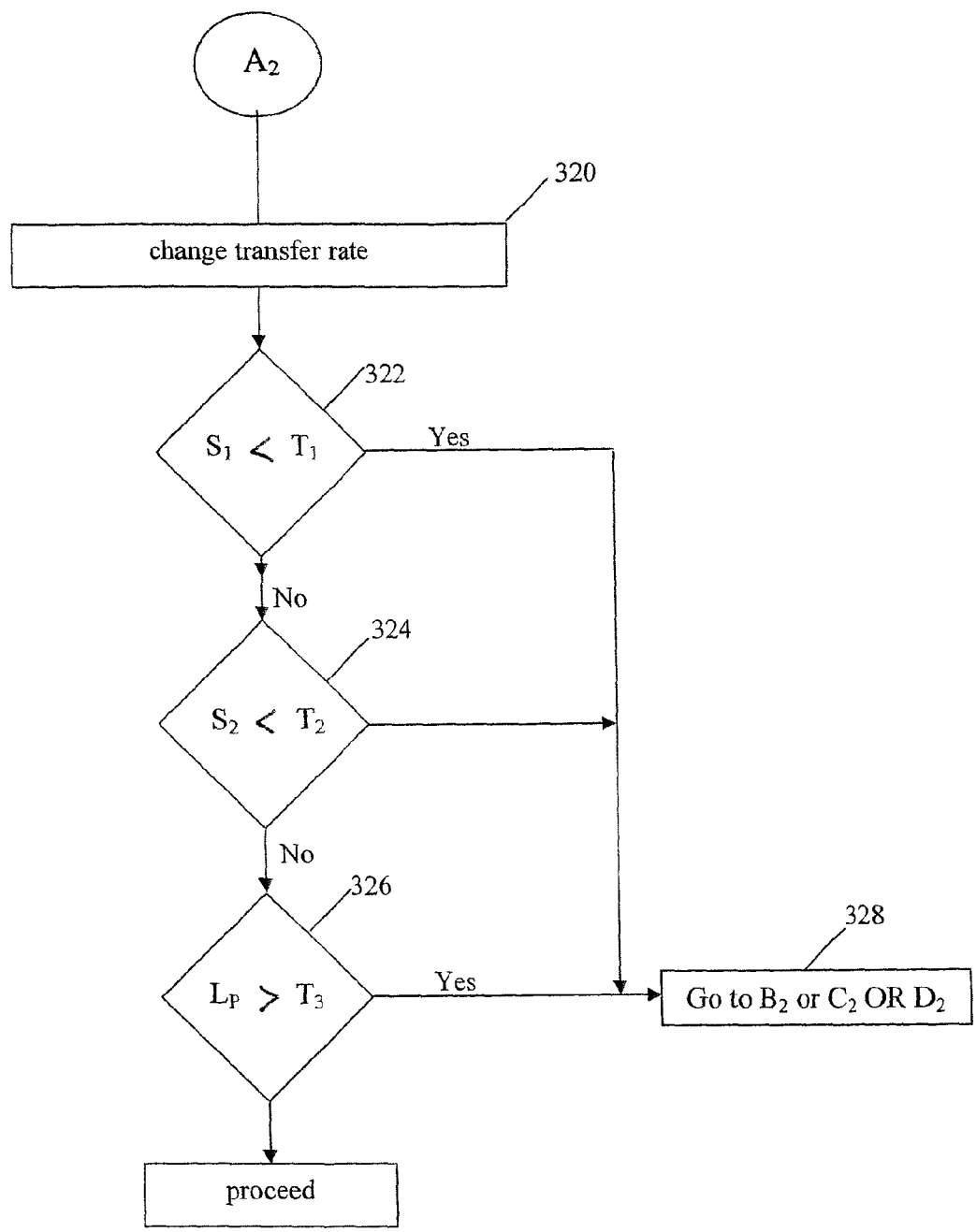
Figure 4C:
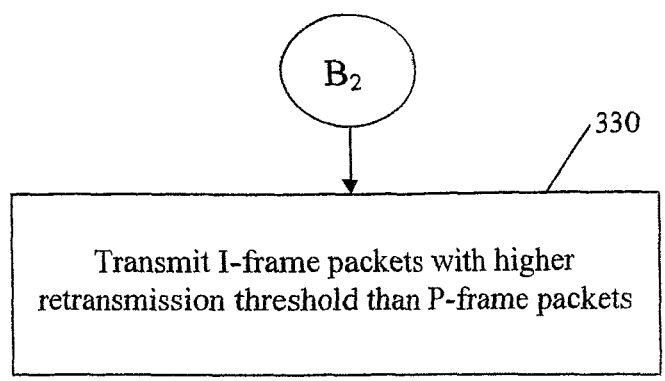
Figure 4C:
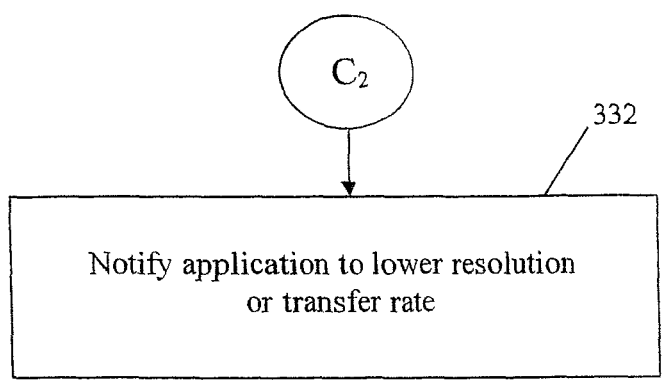
Figure 4C:
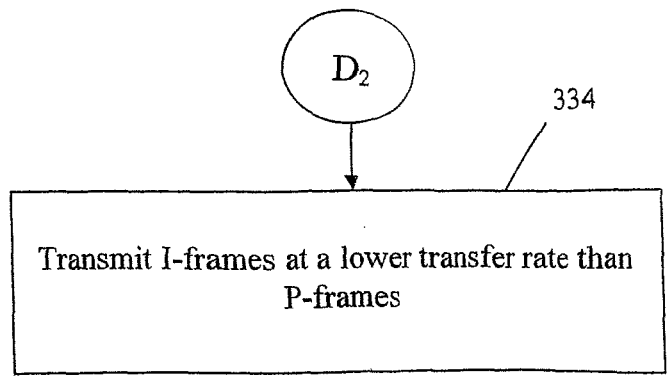

A process for implementing the present invention in the point-to-point topology of video surveillance system 200 is illustrated in FIGS. 4A, 4B, and 4C. In this instance, there is no traffic scheduler as in the case of the point-to-multipoint topology. Rather, the 802.11 media access control protocol is applied. Although the process applies to all of the encoders, only one encoder will be addressed for the sake of simplicity and clarity. At step 302, wireless bridge 206 transmits packets of video data to wireless bridge 208, and at step 304 wireless bridge 208 transmits signals to wireless bridge 206. Wireless bridge 206 monitors the strength of the signals received by wireless bridge 208 at step 306, the strength of signals received by wireless bridge 206 at step 308, and the number of lost packets of video data in the transmission between wireless bridge 206 and wireless bridge 208 at step 310. At steps 312, 314, and 316 respectively, wireless bridge 206 determines if the strength of the signals received by wireless bridge 208 is less than a first predetermined threshold, the strength of the signals received by wireless bridge 206 is less than a second predetermined threshold, and if the number of lost packets is greater than a third predetermined threshold. If the answer is no to each of steps 312, 314, and 316, then the process just proceeds to the next step. If the answer is yes in any of steps 312, 314, and 316, then at step 318, the process goes to $A_2$ in FIG. 4B.

At step 320, wireless bridge 206 changes the bit transfer rate. Wireless bridge 206 then determines at steps 322, 324, and 326 respectively if the strength of the signals received by wireless bridge 208 is less than a first predetermined threshold, the strength of the signals received by wireless bridge 206 is less than a second predetermined threshold, and if the number of lost packets is greater than a third predetermined threshold. If the answer is no to each of steps 322, 324, and 326, then the process just proceeds to the next step. If the answer is yes in any of steps 322, 324, and 326, then at step 328, the process goes to $B_2$ or $C_2$ or $D_2$ on FIG. 4C as alternate steps or could be done serially depending upon the parameters desired in the system design. For example, if desired, the process could conduct further analysis on channel performance, such as repeating the analysis done in steps 322, 324, and 326, to determine if only one or both alternate steps should be taken. At step 330, wireless bridge 206 transmits I-frame packets with a higher retransmission threshold than P-frame packets. In step 332, wireless bridge 206 notifies the application, which is located, for example, in workstation 212 and which is controlling camera 202 and wireless bridge 206, to lower the resolution or bit transfer rate or both.

The methods illustrated in the flowcharts in FIGS. 2A-2C and 4A-4C can be implemented as a software module, which, for example, can be embodied in a Linux device driver on wireless encoders 18, 20, and 22 and wireless access point 24 or wireless bridge 206 and wireless bridge 208. The parameters for configuring the method are provided through a script file at system startup. The methods and software program of the present invention can be stored separately or together on a computer readable medium, which refers to any storage device used for storing data accessible by a computer. Examples of a computer readable medium include a magnetic hard disk, a floppy disk, an optical disk, such as a CD-ROM or a DVD, a magnetic tape, a memory chip, and a carrier wave used to carry computer readable electronic data, such as those used in transmitting and receiving e-mail or in accessing a network.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A method of improving video performance in a video surveillance system having a wireless encoder connected to a video surveillance network by a wireless access point device, said method comprising:

by the wireless access point device, allocating channel bandwidth to the wireless encoder;

by the wireless encoder, transmitting signals comprising packets of video data to the wireless access point device;

by the wireless access point device, transmitting signals to the wireless encoder;

by the wireless encoder, monitoring strength of the signals received by the wireless access point device, strength of the signals received by the wireless encoder, and number of lost packets of video data transmitted from the wireless encoder to the wireless access point device;

by the wireless encoder, sending a request to the wireless access point device to change a bit transmission rate of the wireless encoder if the strength of the signals received by the wireless access point device is less than a first threshold, if the strength of the signals received by the wireless encoder is less than a second threshold, or if the number of lost packets of video data is greater than a third threshold; and by the wireless encoder, changing the bit transmission rate if the wireless access point device approves the change.

2. A method as recited in claim 1 further comprising:
transmitting packets of video data containing an I-frame from the wireless encoder with a higher retransmission threshold than packets of video data containing P-frames if the wireless access point device does not approve the change in the bit transmission rate of the wireless encoder.

3. A method as recited in claim 1 further comprising:
transmitting packets of video data containing an I-frame from the wireless encoder with a higher retransmission threshold than packets of video data containing P-frames if the wireless access point device approves the change in the bit transmission rate of the wireless encoder and after the change, the strength of the signals received by the wireless access point device remain less than the first threshold or the strength of the signals received by the wireless encoder remain less than the second threshold or the number of lost packets of video data is greater than the third threshold.

4. A method as recited in claim 2 further comprising:
transmitting packets of video data containing an I-frame from the wireless encoder with a higher retransmission threshold than packets of video data containing P-frames if the wireless access point device approves the change in the bit transmission rate of the wireless encoder and after the change, the strength of the signals received by the wireless access point device remain less than the first threshold or the strength of the signals received by the wireless encoder remain less than the second threshold or the number of lost packets of video data is greater than the third threshold.

5. A method as recited in claim 1 further comprising:
notifying an application receiving the packets of video data from the wireless encoder to lower requested video image resolution or to lower requested bit transmission rate if the wireless access point device does not approve the change in the bit transmission rate of the wireless encoder.

6. A method as recited in claim 1 further comprising:
notifying an application receiving the packets of video data from the wireless encoder to lower requested video image resolution or to lower requested bit transmission rate if the wireless access point device approves the change in the bit transmission rate of the wireless encoder and after the change, the strength of the signals received by the wireless access point device remain less than the first threshold or the strength of the signals received by the wireless encoder remain less than the second threshold or the number of lost packets of video data is greater than the third threshold.

7. A method as recited in claim 2 further comprising:
notifying an application receiving the packets of video data from the wireless encoder to lower requested video image resolution or to lower requested bit transmission rate if the wireless access point device approves the change in the bit transmission rate of the wireless encoder and after the change, the strength of the signals received by the wireless access point device remain less than the first threshold or the strength of the signals received by the wireless encoder remain less than the second threshold or the number of lost packets of video data is greater than the third threshold.

8. A method as recited in claim 5 further comprising:
notifying the application receiving the packets of video data from the wireless encoder to lower the requested video image resolution or to lower the requested bit transmission rate if the wireless access point device approves the change in the bit transmission rate of the wireless encoder and after the change, the strength of the signals received by the wireless access point device remain less than the first threshold or the strength of the signals received by the wireless encoder remain less than the second threshold or the number of lost packets of video data is greater than the third threshold.

9. A video surveillance system comprising:
a network;
a wireless access point connected to said network;
a camera;
a wireless encoder connected to said camera for transmitting signals comprising packets of video data from said camera to said wireless access point,
said wireless access point allocating channel bandwidth to said wireless encoder and transmitting signals to said wireless encoder indicating strength of the signals received from said wireless encoder and number of lost packets of video data,
said wireless encoder determining strength of signals received from said wireless access point,
said wireless encoder monitoring the strength of the signals received by said wireless access point device, the strength of the signals received by said wireless encoder, and the number of lost packets of video data transmitted from said wireless encoder to said wireless access point,
said wireless encoder sending a request to said wireless access point to change a bit transmission rate of said wireless encoder if the strength of the signals received by said wireless access point is less than a first threshold, if the strength of the signals received by said wireless encoder is less than a second threshold, or if the number of lost packets of video data is greater than a third threshold; and
changing the bit transfer transmission rate of said wireless encoder if said wireless access point approves the change.

10. A video surveillance system as recited in claim 9 wherein the packets of video data transmitted by said wireless encoder comprise I-frames and P-frames and said wireless encoder transmits packets of video data containing an I-frame with a higher retransmission threshold than packets of video data containing P-frames if said wireless access point does not approve the change in the bit transmission rate of said wireless encoder.

11. A video surveillance system as recited in claim 9 wherein the packets of video data transmitted by said wireless encoder comprise I-frames and P-frames and said wireless encoder transmits packets of video data containing an I-frame with a higher retransmission threshold than packets of video data containing P-frames if said wireless access point approves the change in the bit transmission rate of said wireless encoder and after the change, the strength of the signals received by said wireless access point remain less than the first threshold or the strength of the signals received by said wireless encoder remain less than the second threshold or the number of lost packets of video data is greater than the third threshold.

12. A video surveillance system as recited in claim 9 wherein said network comprises an application receiving the packets of video data transmitted by said wireless encoder and said wireless encoder notifies said application to lower requested video image resolution or to lower requested bit transmission rate if said wireless access point does not approve the change in the bit transmission rate of said wireless encoder.

13. A video surveillance system as recited in claim 9 wherein said network comprises an application receiving the packets of video data transmitted by said wireless encoder and said wireless encoder notifies said application to lower requested video image resolution or to lower requested bit transmission rate if said wireless access point approves the change in the bit transmission rate of said wireless encoder and after the change, the strength of the signals received by said wireless access point remain less than the first threshold or the strength of the signals received by said wireless encoder remain less than the second threshold or the number of lost packets of video data is greater than the third threshold.

14. A method of improving video performance in a video surveillance system, the method comprising:

by a wireless encoder:
  transmitting signals comprising packets of video data to a wireless access point device;
  monitoring strength of the signals received by the wireless access point device, strength of signals received by the wireless encoder, and number of lost packets of video data transmitted from the wireless encoder to the wireless access point device;
  sending a request to the wireless access point device to change a bit transmission rate of the wireless encoder if the strength of the signals received by the wireless access point device is less than a first threshold, if the strength of the signals received by the wireless encoder is less than a second threshold, or if the number of lost packets of video data is greater than a third threshold; and
  changing the bit transmission rate if the wireless access point device approves the change.

* * * * *